US009382138B2

(12) United States Patent
Tucker

(10) Patent No.: US 9,382,138 B2
(45) Date of Patent: Jul. 5, 2016

(54) ADVANCED ON-SITE WATER SANITIZATION SYSTEM HAVING CHLORINE GENERATION INTEGRATED WITH COPPER/SILVER IONIZATION

(71) Applicant: Daniel Moroni Tucker, Walnut Creek, CA (US)

(72) Inventor: Daniel Moroni Tucker, Walnut Creek, CA (US)

(*) Notice: Subject to any disclaimer, the term of this patent is extended or adjusted under 35 U.S.C. 154(b) by 0 days.

(21) Appl. No.: 13/927,104

(22) Filed: Jun. 25, 2013

(65) Prior Publication Data

US 2013/0284649 A1    Oct. 31, 2013

Related U.S. Application Data

(63) Continuation-in-part of application No. 12/694,039, filed on Jan. 26, 2010, now Pat. No. 8,470,143.

(51) Int. Cl.
*C02F 1/467* (2006.01)
*C02F 1/50* (2006.01)
*C02F 1/00* (2006.01)
C02F 1/44 (2006.01)
C02F 103/42 (2006.01)

(52) U.S. Cl.
CPC .............. *C02F 1/4674* (2013.01); *C02F 1/008* (2013.01); *C02F 1/505* (2013.01); *C02F 1/441* (2013.01); *C02F 2103/42* (2013.01); *C02F 2201/002* (2013.01); *C02F 2209/06* (2013.01); *C02F 2209/29* (2013.01); *C02F 2303/14* (2013.01); *Y02W 10/37* (2015.05); *Y10T 29/49117* (2015.01)

(58) Field of Classification Search
CPC ..... C02F 1/4674; C02F 1/505; C02F 2103/42
USPC ........................................................ 204/229.8
See application file for complete search history.

(56) References Cited

U.S. PATENT DOCUMENTS

| | | | |
|---|---|---|---|
| 3,751,233 A | 8/1973 | Tischler | |
| 4,439,295 A | 3/1984 | Richards | |
| 4,484,991 A | 11/1984 | Angelo et al. | |
| 4,599,159 A * | 7/1986 | Hilbig | 204/266 |
| 4,693,806 A | 9/1987 | Tucker | |
| 4,781,810 A | 11/1988 | Tucker | |
| 5,688,385 A | 11/1997 | Rhees et al. | |
| 6,562,243 B2 | 5/2003 | Sherman | |
| 2002/0011436 A1* | 1/2002 | Blanchette et al. | 210/198.1 |
| 2002/0189954 A1 | 12/2002 | Miyazaki et al. | |
| 2003/0049137 A1 | 3/2003 | Broerman et al. | |
| 2004/0140200 A1 | 7/2004 | Lemke | |
| 2006/0169647 A1* | 8/2006 | Doyle et al. | 210/739 |

(Continued)

*Primary Examiner* — Bryan D. Ripa
(74) *Attorney, Agent, or Firm* — Russ Weinzimmer & Associates, P.C.

(57) ABSTRACT

An advanced on-site water sanitization system is taught having integrated chlorine generation and copper/silver ionization in the same unit. The system includes a manifold loop connectable to a water supply line for supplying water to be sanitized from a body of water, and connectable to a water return line for returning sanitized water to the body of water. It also includes a copper/silver ionizer, capable of receiving a flow of water to be sanitized, adding copper and silver ions to the flow of water so as to provide a copper/silver ionized flow of water. A chlorinator is also included, capable of receiving a flow of ionized water, and a flow of chlorine, and allowing the flow of chlorine to mix with the flow of ionized water so as to provide a chlorinated flow of ionized water to the manifold loop to return as sanitized water to the body of water.

17 Claims, 9 Drawing Sheets

(56) References Cited

U.S. PATENT DOCUMENTS

2008/0128363 A1* 6/2008 Costa et al. .................. 210/752
2008/0264447 A1* 10/2008 Eyal ................................ 134/18
2008/0314762 A1* 12/2008 Jones et al. ................... 205/687

* cited by examiner

ADVANCED ON-SITE WATER SANITIZATION SYSTEM HAVING CHLORINE GENERATION INTEGRATED WITH COPPER/SILVER IONIZATION

CROSS-REFERENCE TO RELATED APPLICATIONS

This application is a continuation-in-part of application Ser. No. 12/694,039, filed Jan. 26, 2010, the disclosure of which is hereby incorporated by reference in its entirety.

FIELD OF THE INVENTION

The present invention generally relates to sanitizing water, and more particularly relates to on-site systems for sanitizing a body of water, such as a swimming pool, or a drinking water supply.

BACKGROUND OF THE INVENTION

Swimming pools and drinking water supplies, as well as other bodies of water, must be sanitized in order to be safe for human use. As used herein, "sanitize", and similar terminology refers to disinfecting the object by killing microorganisms.

It is instructive to review commonly available techniques that are presently used to sanitize swimming pools, drinking water supplies and other bodies of water.

In the case of swimming pools, a lack of proper sanitization can result in damaged pool equipment, damaged pool surfaces, and can allow water therein to become a breeding ground for disease-causing bacteria, viruses, parasites, algae, mold and fungi. In the case of drinking water supplies, lack of proper sanitization can result in damaged pumping equipment, damaged water holding tanks, and can allow water therein to become a breeding ground for the afore mentioned disease-causing bacteria, viruses, parasites, algae, mold and fungi. Although known methods of sanitizing swimming pools, drinking water supplies and other bodies of water have proved suitable for their intended purposes, there are nonetheless challenges inherent in the use of such methods.

In this regard, chlorine is a well-known and frequently used chemical for sanitizing both swimming pool water and drinking water. Since chlorine is an effective and relatively inexpensive sanitizing agent, and because testing for residual chlorine is inexpensive and relatively easy, chlorine is often the agent of choice for sanitizing swimming pools, as well as drinking water. Maintaining chlorine concentration of 1-3 ppm is considered adequate by many local boards of health.

In addition, use of copper/silver ions in water disinfecting techniques is also known. For example, the early Greeks used copper and silver goblets and vessels for drinking water therefrom, and for storing water. The low solubility of these copper/silver ions in the water served as a natural, controlled release mechanism that added trace amounts of these copper/silver ions into the water. The concentration amounts were high enough to purify the water without causing objectionable taste. More recent use of copper and silver ions to inactivate microorganisms in water is well-documented. In addition to being a bacteriacide, the copper and silver ions, in concentrations of parts per billion (ppb), are also effective in controlling viruses, parasites, algae, mold, and fungi.

Also, copper and silver ion disinfection of swimming pool water and drinking water has several benefits over chlorine. In this regard, copper and silver ions are chemically stable, and do not undergo the destructive reactions of aqueous chlorine, which destructive reactions can cause corrosion of metal pipes (e.g., lead and copper pipes), water pumps, pool surfaces, and other components. The corrosion, which can result from presence of chloramines, is caused by changes in chemical properties of the water. The terminology "chloramine" refers to derivatives of ammonia, and can include monochloramine ($NH_2CL$) or a family of organic compounds. The family of organic compounds can have the formulae $R_2NCL$ and $RNCL_2$, where R is an organic group. Other chloramines include dichloramine ($NHCL_2$) and nitrogen trichloride ($NCL_3$). In addition to chloramines, objectionable by-products can also include trihalomethanes (THM) and haloacetic acid (HAA). Copper and silver ions, on the other hand, do not form objectionable by-products such as chloramines, trihalomethanes (THM), and haloacetic acid (HAA).

In addition to increasing likelihood of corrosion, chloramines are also objectionable because uncontrolled amounts of chloramines can cause water quality problems, such as nitrification. Nitrification, which can result from the bacterial oxidation of ammonia, can cause loss of disinfectant residual in the water. The loss of disinfectant residual is due to conversion of ammonia into nitrite and then to nitrate. In the case of swimming pools, production of ammonia can result from sweat and urine excreted by swimmers. The sweat and urine are broken-down by chemicals in the water, such that ammonia is separated-out. Ammonia can also enter the water from decaying plant material, such as decaying leaves in the water, or from fertilizer present on nearby plants, such as fertilized grass and shrubbery located near the pool water. Presence of ammonia, in combination with chlorine in swimming pool water, can cause skin and eye irritation.

Therefore, a consideration in the art of water sanitation is the presence of chlorine in an amount that can lead to corrosion of lead and copper components (e.g., piping and pumping components) by changing chemical properties of the water. Another consideration in the art of water sanitation is the presence of chlorine in an amount that, when combined with ammonia excreted by swimmers, can lead to skin and eye irritation. Yet another consideration in the art of water sanitation is increased loss of disinfectant residual due to nitrification.

In the case of the previously mentioned trihalomethanes, the most relevant by-product is chloroform, which can escape from swimming pool water and be inhaled by swimmers. Even low concentrations of chloroform have been linked to renal and liver defects. Therefore, another consideration in the art of water sanitation is generation of trihalomethanes that can, in turn, produce chloroform.

Swimming pool owners generally take care of the chemistry of pool water in any one of several ways. For example, a swimming pool owner may hire a pool service company to apply the chemicals necessary to keep the water pH balanced and the water sanitized. In this regard, the pool service company may use various techniques for controlling the chemistry of the pool water. Those techniques may include use of the following commonly available apparatus for adjusting the amount of chlorine applied to the pool water: (1) an adjustable pump that takes liquid chlorine from a storage vat and injects it into the pool's return line; (2) a chlorine tablet holder that is installed in the water return line and that allows chlorine tablets to be dissolved at an adjustable rate; and (3) a dispenser that automatically dumps chlorine powder into a container that has pool water circulating through the container. However, another consideration in the art of water sanitation is that the initial cost and on-going maintenance costs of such commonly available apparatus may be cost-prohibitive for many pool owners.

A bromine dispenser is yet another known apparatus used for sanitizing swimming pool water and other bodies of water. In the case of swimming pools, the bromine dispenser dispenses bromine (Br) into the pool water to be sanitized. However, bromine, which is available in tablet form and can be added to pool water by a dispenser that dissolves the tablets, is more expensive than chlorine products. Also, in the case of outdoor pools, sunlight can convert active bromine into inactive bromates. In addition, bromine should not be added to swimming pool water containing chlorine because chlorine converts used-up bromine to free bromine. During this chemical conversion process, the chlorine is then converted to used-up chlorine. Therefore, another consideration in the art of pool water sanitation is that use of bromine in the presence of chlorine does not significantly enhance the process of sanitizing pool water.

Yet another method for dispensing chemicals into pool water to be sanitized is to have a pool service company bring compressed chlorine gas to the site, and inject it into the water being treated. However, this method is outlawed in many areas because of extreme hazards associated with using this method. Such hazards include possibility of pool accidents causing human exposure to the chlorine gas in a manner resulting in possible bronchial edema, asphyxiation, and pulmonary injury.

Use of ultraviolet light is yet another method for sanitizing swimming pool water. Use of ultraviolet light is preferred by some pool owners because ultraviolet light is not chemically active and does not use chemical additives. Therefore, use of ultraviolet light is more environmentally friendly compared to use of chemicals. Also, use of ultraviolet light does not require water testing, which can be inaccurate. The ultraviolet light sanitation process uses a clear glass cell containing an ultraviolet light source to sanitize the pool water. According to this method, a mercury vapor glass lamp generates shortwave ultraviolet light radiation that kills bacteria, viruses, parasites, algae, mold, and fungi. However, in order for the ultraviolet light to properly kill the bacteria, viruses, parasites, algae, mold, and fungi, the water should not be turbid or cloudy. Turbidity, which is due to suspended solids in the water, or cloudiness of the water, prevents the ultraviolet light from adequately penetrating the water in order to kill the bacteria, viruses, parasites, algae, mold, and fungi. For this reason, use of ultraviolet light can be expensive, because the water must be pre-filtered by suitable, extremely efficient filtering apparatus to remove particulate matter (i.e., suspended solids) that would otherwise cause turbidity and cloudiness. Purchase of such suitable, extremely efficient filtering apparatus increases the cost of the ultraviolet light installation. Also, use of ultraviolet light offers no residual sanitizing effect, because the sanitizing effect of the ultraviolet light will not stay in the water once the water passes by the ultraviolet light, and once the light source ceases emission of the ultraviolet light. Chlorine, on the other hand, remains in the water after treatment. Thus, a limitation or consideration associated with use of ultraviolet light is that ultraviolet light is best used in combination with chemical agents, such as chlorine, in order to suitably sanitize the water. Purchase of apparatus that uses both ultraviolet light and chlorine can increase the cost of the sanitization system.

Ozonator cells are yet another method for sanitizing swimming pool water and other bodies of water. This type of cell uses high voltage electricity to create ozone from the air. The ozone, which can be an effective bactericide, is injected into the pool water by means of a water return line connected to the pool. The ozone can be produced by a corona discharge technique that includes passing air through an electrically charged chamber that converts oxygen to ozone. However, ozone is not highly soluble in water, and therefore should be injected into the water by a compressor. Use of a compressor increases cost of using ozone. Also, when using ozone to sanitize pool water, some of the ozone may be released into the air. Such air-borne ozone may create a respiratory health hazard to pool maintenance personnel and swimmers because ozone can adversely affect the lungs. In addition, ozone leaves the water rapidly, leaves no residual, and is difficult to test, so ozone is not considered a suitable method by boards of health unless the ozone is paired with chlorine or other sanitizing agent that leaves a residual. Therefore, a consideration associated with using ozone is the initial cost of a compressor and the possible deleterious health effects.

Another method associated with swimming pool sanitization is use of inline chlorine generators. Inline chlorine generators have become accepted by pool owners in recent years. In this case, salt is added to the pool water and then an inline chlorine-generating device produces chlorine from the salt in the pool water. For the most part, known methods of on-site chlorine generation have not been adequate either for treating large commercial swimming pools, or for treating other large bodies of water. Therefore, a consideration associated with use of on-site chlorine generation alone is the difficulty of treating large commercial swimming pools or other large bodies of water.

Use of commercial chlorine products in the form of powders and tablets for treating pool water and other bodies of water is also known. These forms of chlorine usually contain cyanuric acid, which is commonly called "pool stabilizer." Stabilizer slows down the reaction of chlorine to make the chlorine last longer in the swimming pool or other body of water. Too little stabilizer will not properly stabilize the pool water and too much stabilizer can inhibit the chlorine's ability to kill bacteria fast enough for the pool water to be safe for swimmers. Therefore, many local boards of health state that stabilizer concentration over 75 ppm (i.e., 75 parts per million) is unsafe because such a concentration will slow the ability of chlorine to kill bacteria. However, after the chlorine delivered by these products has dissipated from the pool water, the stabilizer remains. This result prevents commercial pool owners from using pill, powder, and tablet forms of chlorine as the sole method for sanitation when the pool is being used for an extended period of time due to the undesirable build-up of stabilizer during such extended periods of time. Therefore, another consideration in the art is the presence of built-up stabilizer in a concentration that slows down the reaction of chlorine to a level that presents a health hazard to swimmers.

Another issue associated with using commercial chlorine in the form of pills, powders, and tablets, and also in the form of liquid sodium hypochlorite (NaClO) or bleach, is that as much as 90% of the "chlorine" that is purchased is not chlorine, but instead includes inert ingredients that manufacturers add to their products to stabilize the chlorine, and to give it shelf life. In the case of pills, powders, and tablets, these inert ingredients can add a relatively large amount of undesirable dissolved solids into the pool water. These dissolved solids can eventually cause staining of the pool finish, discomfort for swimmers, and can shorten the life of pool filtering equipment. Therefore, another consideration in the art is presence of dissolved solids in the water due to inert ingredients added to the chlorine by manufacturers.

Another consideration relates to issues associated with transportation of chemicals used to sanitize swimming pools and other bodies of water. In this regard, chemicals used in treating pool water are manufactured off-site, usually in a rural area away from heavily populated cities and towns. Since chlorine in its pure form is a gas and is chemically unstable, additives are added to stabilize the chlorine and to give it shelf life. These additives include stabilizer, salt, calcium, soda ash, and other constituents, and are transported to the chemical manufacturing facility. After the pool chemicals are manufactured, they are placed in bottles, or other suitable containers, labeled as "hazardous products", and then shipped to cities and towns to be stored by wholesalers in warehouses. The products are then shipped in smaller amounts to retail stores where they are purchased by service companies and end users. The chemicals are then transported to the pool site where they are stored until they are used. However, a vehicular accident while transporting concentrated pool chemicals, or improper storage of these chemicals, can result in the chemicals getting mixed with other chemicals. Mixed chemicals can cause fires, explosions, and the emission of dangerous and deadly gases that can endanger children as well as adults. Therefore, another consideration in the art is risk of injury due to transportation of such chemicals from chemical manufacturing facilities to warehouses, retail stores and end users.

Thus, in treating larger bodies of water, such as commercial swimming pools, it is difficult to achieve proper sanitation on-site using any of the above methods alone.

SUMMARY OF THE INVENTION

The present invention disclosed herein sanitizes swimming pools and drinking water supplies, as well as other larger bodies of water, in a cost-effective, efficient, safe, and convenient manner.

The present invention addresses the shortcomings of the prior art approaches mentioned hereinabove by providing an advanced on-site integrated chlorine generation and copper/silver ionization system for sanitizing a body of water, and a method of manufacturing the advanced on-site system. More specifically, the advanced on-site water sanitization system with integrated chlorine generation and copper/silver ionization in a single unit addresses the limitations mentioned hereinabove relating to current methods of sanitation for residential swimming pools, commercial swimming pools, drinking water supplies, and other bodies of water.

The terminology "on-site" is defined herein to mean a location at or near the location of a body of water to be sanitized.

In this regard, the present invention sanitizes swimming pools, drinking water supplies, as well as other bodies of water, by killing disease-causing bacteria, viruses, parasites, algae, mold, and fungi in a cost-effective, efficient, safe, and convenient manner.

The invention also reduces likelihood of damaged swimming pool equipment, damaged swimming pool surfaces, and damaged drinking water pumping station equipment, in addition to reducing likelihood of damaging other apparatus associated with the sanitation process.

A desirable outcome resulting from use of the invention is efficient control of concentration of chlorine in the water, and reduced chlorine use. Thus, use of the invention reduces aggregate consumption of chlorine that is transported to wholesalers, retail stores, and end users. Reduction of aggregate consumption of chlorine reduces likelihood and frequency of traffic accidents that would otherwise cause injury to those traveling on roads and highways by releasing concentrated pool chemicals into the environment. This risk is reduced because, due to reduced aggregate chlorine consumption, fewer transportation vehicles are needed to transport the chemicals.

Also, use of the invention enhances water quality by avoiding formation of objectionable by-products, such as chloramines, trihalomethanes (THM), and haloacetic acid (HAA), which can otherwise cause loss of disinfectant residual in the water, and which can cause corrosion.

In addition, pool maintenance safety is increased because use of compressed chlorine gas is not required. Use of compressed chlorine gas increases likelihood of pool accidents causing human exposure to the chlorine gas in a manner resulting in possible bronchial edema, asphyxiation, and pulmonary injury.

Further, the invention is useable to sanitize bodies of water, even when the water is turbid or cloudy, and is therefore an improvement over using ultraviolet light alone. In this regard, the invention does not require installation of expensive, extremely efficient pre-filtering equipment to remove particulate matter that causes the turbidity and cloudiness. Moreover, use of the invention does not require use of ozone, which may present a respiratory health hazard. Avoiding use of ozone also decreases equipment installation costs, because a compressor for the ozone is not required.

The enhancements recited immediately hereinabove provide a safe, cost-effective, and convenient means for sanitizing swimming pool water, drinking water supplies, and other bodies of water.

A general aspect of the invention is an advanced on-site water sanitization system, wherein the system includes: a manifold loop connectable to a water supply line for supplying water to be sanitized from a body of water, and connectable to a water return line for returning sanitized water to the body of water; a copper/silver ionizer, in fluid communication with the manifold loop, capable of receiving a flow of water to be sanitized, adding copper and silver ions to the flow of water so as to provide a copper/silver ionized flow of water; and a chlorinator, in fluid communication with the manifold loop, capable of receiving a flow of ionized water, and a flow of chlorine, and allowing the flow of chlorine to mix with the flow of ionized water so as to provide a chlorinated flow of ionized water to the manifold loop to return as sanitized water to the body of water via the water return line.

In some embodiments, the chlorinator is a venturi device capable of sucking the flow of chlorine into the flow of ionized water.

In some embodiments, the chlorinator is a T-connector, and the flow of chlorine is pumped via the T-connector into the flow of ionized water.

In some embodiments, the system also includes a chlorine generator capable of providing the flow of chlorine to the chlorinator.

In some embodiments, the chlorine generator includes a brine tank capable of containing a softened brine solution having at least one chloride compound dissolved therein; and a chlorine generation cell submergeable in the softened brine solution, the chlorine generation cell being for generating chlorine from the at least one chloride compound.

In some embodiments, the system also includes a power supply, coupled to the chlorine generation cell and to the copper/silver ionization cell, for supplying electrical power to the chlorine generation cell and to the copper/silver ionization cell.

In some embodiments, the power supply includes a timing device coupled to the chlorine generation cell and to the metal ionization cell for timed supply of electrical power to the chlorine generation cell and the metal ionization cell.

In some embodiments, the at least one chloride compound is selected from the group including: sodium chloride, calcium chloride, potassium chloride.

In some embodiments, the system includes: a water flow restrictor, in fluid communication with both the water supply line and the water return line, the water flow restrictor being capable of restricting flow of water directly from the water supply line to the water return line, thereby redirecting water to be sanitized from the water supply line to the manifold loop.

In some embodiments, the manifold loop includes a booster pump for pulling water to be sanitized from the water supply line, and pushing the water to be sanitized into the manifold loop.

In some embodiments, the copper/silver ionizer includes: two identical electrodes of a copper/silver alloy.

In some embodiments, the programmable timing device includes: first timer coupled to the adjustable power supply for timing the operation of the electrical power to the chlorine generation cell; and a second timer coupled to an adjustable pulsating power supply for timing the operation of the electrical power to the copper/silver ionization cell.

In some embodiments, the system also includes a flow sensing device coupled to the venturi device for sensing flow of water through the venturi device.

In some embodiments, the system also includes a conductivity sensing device coupled to the venturi device for sensing conductivity of water being sanitized.

Another general aspect of the invention is an advanced on-site water sanitization system, the system including: a manifold loop connectable to a water supply line for supplying water to be sanitized from a body of water, and connectable to a water return line for returning sanitized water to the body of water; a plurality of copper/silver ionizers, in parallel fluid communication with the manifold loop, each copper/silver ionizer being capable of receiving a flow of water to be sanitized, adding copper and silver ions to each respective flow of water so as to provide a plurality of copper/silver ionized flows of water; and a plurality of chlorinators, in parallel fluid communication with the manifold loop, each capable of receiving a flow of ionized water, and a flow of chlorine, and allowing the flow of chlorine to mix with the respective flow of ionized water so as to provide a plurality of chlorinated flows of ionized water to the manifold loop to return as sanitized water to the body of water via the water return line.

In some embodiments, each chlorinator is a venturi device capable of sucking a respective flow of chlorine into a respective flow of ionized water.

In some embodiments, each chlorinator includes a T-connector, and the each flow of chlorine is pumped via the T-connector into a respective flow of ionized water.

In some embodiments, the system also includes a chlorine generator capable of providing a plurality of flows of chlorine to a respective plurality of chlorinators.

In some embodiments, the system also includes a power supply, coupled to each chlorine generation cell and to each copper/silver ionization cell, for supplying electrical power to the plurality of chlorine generation cell and to the plurality of copper/silver ionization cells.

Another general aspect of the invention is a method of manufacturing an on-site integrated chlorination and metal ionization system for sanitizing a flow of water. The method includes: providing a manifold loop connectable to a water supply line for supplying water to be sanitized from a body of water, and connectable to a water return line for returning sanitized water to the body of water; providing a copper/silver ionizer, connected in fluid communication with the manifold loop, capable of receiving a flow of water to be sanitized, and adding copper and silver ions to the flow of water so as to provide a copper/silver ionized flow of water; providing a chlorinator, connected in fluid communication with the manifold loop, capable of receiving a flow of ionized water, and a flow of chlorine, and allowing the flow of chlorine to mix with the flow of ionized water so as to provide a chlorinated flow of ionized water to the manifold loop to return as sanitized water to the body of water via the water return line; and providing a power supply connected to the source of chlorine and to the source of copper/silver ions.

BRIEF DESCRIPTION OF THE DRAWINGS

The invention will be more fully understood by reference to the detailed description, in conjunction with the following figures, wherein.

DETAILED DESCRIPTION

Figure 1:
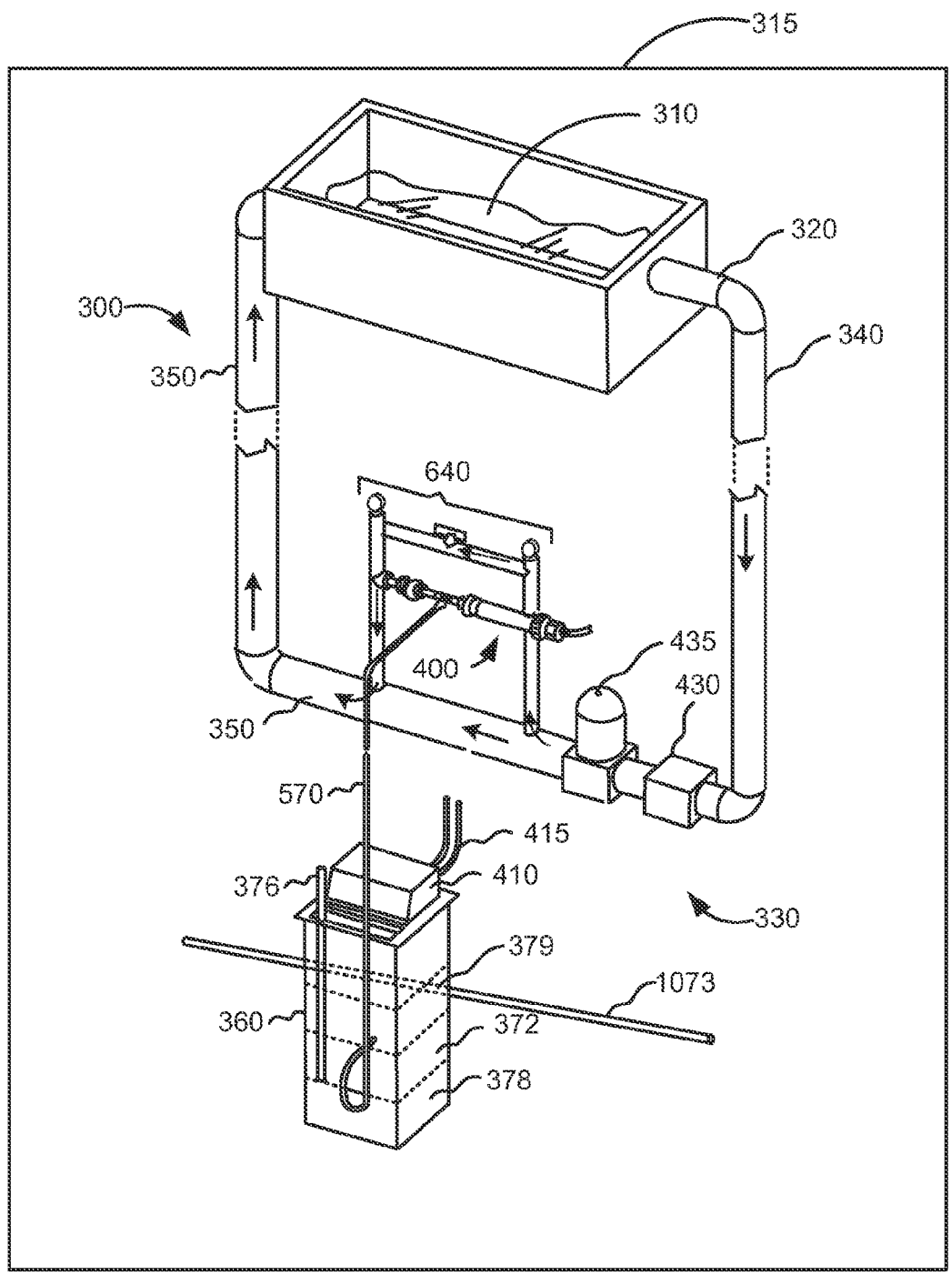
FIG. 1 is a schematic representation, with parts removed for clarity, of a first embodiment of an on-site chlorine generation and copper/silver ionization system for sanitizing a body of water.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from either the spirit or scope of the invention.

In addition, the present patent specification uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Therefore, with reference to FIG. 1, there is shown, with parts removed for clarity, a first embodiment of an advanced on-site chlorine generation and copper/silver ionization system, generally referred to as 300 (hereinafter "system 300"), for sanitizing a relatively small body of water 310, such as an in-ground or above-ground residential swimming pool. System 300 is locatable at a site 315 having body of water 310. The body of water 310, which forms no part of the present invention, may be virtually any body of water, such as a swimming pool or a drinking water supply. System 300 includes a water recirculation loop, generally referred to as 320, for re-circulating water between body of water 310 and a chlorine generation and copper/silver ionization assembly, generally referred to as 330. Chlorine generation and copper/silver ionization assembly 330 includes a device for generating chlorine and a device for generating copper/silver ions. Structure and operation of copper/silver ionization assembly is described in detail hereinbelow. In the embodiments disclosed herein, water recirculation loop 320 is preferably in the form of pipes.

Referring again to FIG. 1, water recirculation loop 320 includes a water supply line 340 in the form of a pipe. Water supply line 340 extends from body of water 310 to water treatment assembly 330 for supplying water from body of water 310 to water treatment assembly 330. The material comprising water supply line 340 can be, without limitation, lead, copper, iron, steel, alloys and combinations thereof, polyvinyl chloride (PVC) plastic or other suitable material.

As previously mentioned, chlorine, which is used to resist microbial growth in body of water 310, can also be corrosive to many commonly available pipe materials and, hence, can cause a pipe leak, which is undesirable. Therefore, in order to resist corrosion as well as to resist microbial growth, supply line 340 may be manufactured by injection molding using high density polyethylene (HDPE). The polyethylene composition of HDPE is particularly beneficial for use with swimming pool and drinking water systems because polyethylene does not provide nutrients for microorganisms and, therefore, resists microbial growth. Also, the polyethylene composition of HDPE is a nonconductive, dielectric material and therefore resists corrosion. In the event supply line 340 is manufactured from a metal, such as the afore mentioned lead, copper, iron, steel, or alloys and combinations thereof; then, in such event, the interior of supply line 340 may be coated with a suitable epoxy that is resistant to corrosion by chlorine, sodium chloride, nitrates, chloramines, trihalomethanes (THM), haloacetic acid (HAA) and other chemicals found in swimming pools, drinking water supplies, and other bodies of water. Such an epoxy may be, by way of example only and not by way of limitation, an epoxy comprising polyamideaeoamine (PAMAM). Also, if made of metal, supply line 340 may be manufactured from an anti-corrosive steel comprising constituents selected from the group consisting essentially of iron, chromium, nickel, molybdenum, and combinations thereof. In addition, the interior of water supply line 340 is also manufactured to be as smooth as possible to reduce water pressure loss that, in turn, reduces pumping power required. Reducing required pumping power reduces size of pumps and, therefore, installation costs and on-going electricity costs to operate the pumps. It should be appreciated that all such compositions and manufacturing techniques recited hereinabove are contemplated for use with water recirculation loop 320, including water supply line 340, of the present invention.

Referring yet again to FIG. 1, water recirculation loop 320 includes a water return line 350. Water return line 350 extends from water treatment assembly 330 to body of water 310 for returning treated water to body of water 310. The material comprising water return line 350 can be, without limitation, the materials recited hereinabove with respect to water supply line 340. The interior of water return line 350 is also manufactured to be smooth as possible to reduce water pressure loss for reasons recited hereinabove with respect to water supply line 340.

Figure 2:
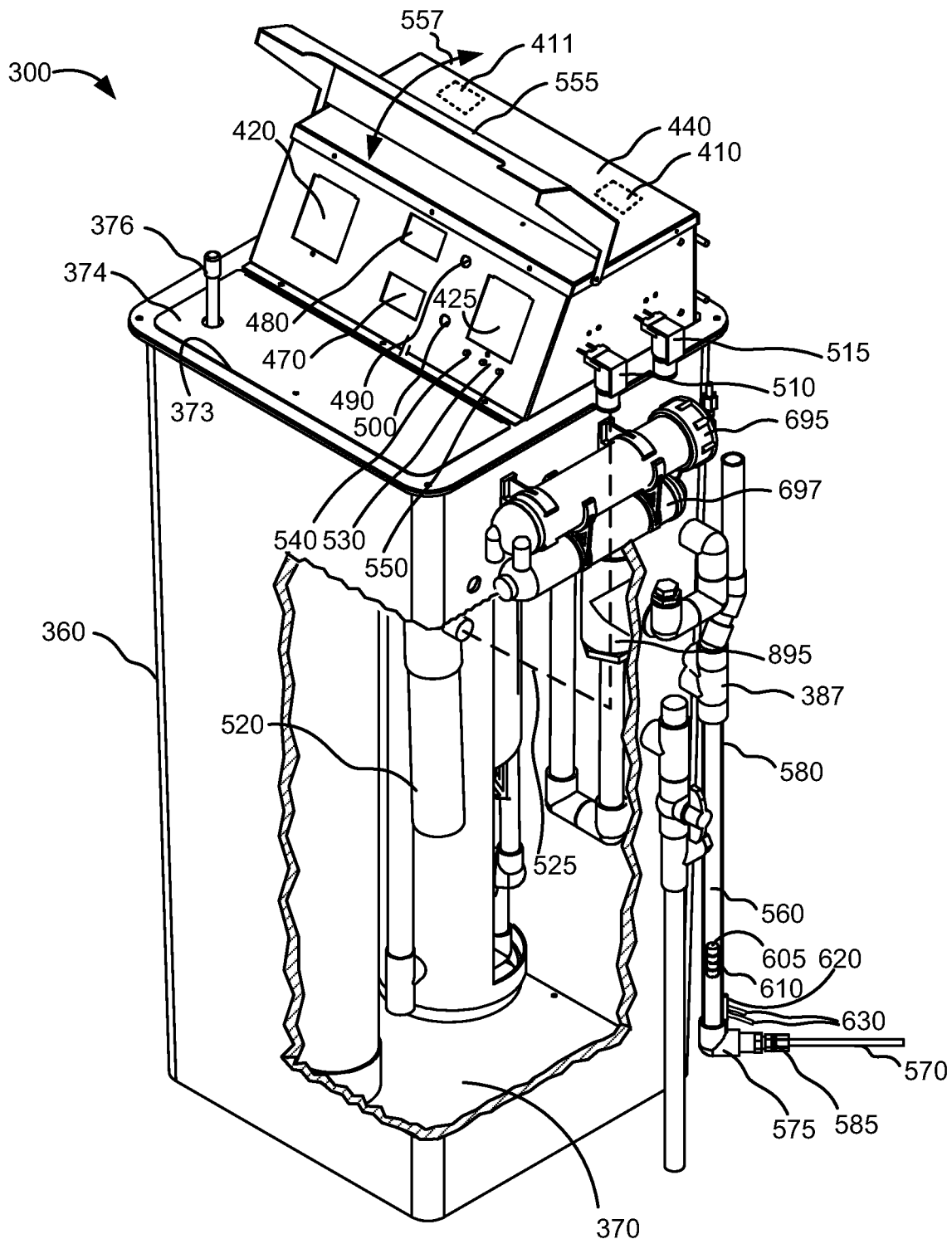
FIG. 2 is a view in perspective and partial vertical section of a power supply, brine tank, and related components.

Referring to FIGS. 1 and 2, a sealed container, enclosure, vessel or tank 360 is provided. Tank 360 is adapted to be disposed at site 315 that has body of water 310. Tank 360 defines an interior volume 370 for containing a brine solution 372 (e.g., a halide salt solution or formate salt solution). Brine solution 372 has a chloride composition dissolved therein and defines a surface 372a thereon. Brine solution 372 is commercially available in virtually any quantity and concentration, and forms no part of the present invention. The chloride composition may be selected from the group consisting essentially of sodium chloride (NaCl), potassium chloride (KCl), and combinations thereof.

In addition, tank 360 defines an opening 373 for introducing brine solution 372 into tank 360, such as by means of pouring or pumping brine solution 372 into tank 360. Opening 373 also provides means for emptying the brine solution 372 from tank 360, such as by means of any commercially available suction pump (not shown). Removably or pivotally connected to tank 360 is a lid 374 for covering opening 373. A purpose of lid 374 is to prevent introduction of foreign material (e.g., dust, fertilizer applied to nearby grass and shrubbery, leaves from trees) into interior volume 370 that is defined by tank 360. Preventing introduction of such foreign material avoids unwanted contamination of brine solution 372. In addition, vertically extending into tank 360 is an elongate salt level indicator rod 376 that is used to determine level of un-dissolved salt 378 in tank 360. If the level of un-dissolved salt 378 is too low, then the user will add salt through opening 373. The un-dissolved salt 378 preferably includes clean course water softener salt, rather than pool salt. Use of clean course water softener salt avoids plugging-up components. Pool salt, on the other hand, has too fine a grain size that increases risk that components will plug-up and impede water flow. Salt level indicator rod 376 rides or floats on the top surface of un-dissolved salt layer 378. Therefore, the amount of travel of rod 376 indicates the level of un-dissolved salt 372 in tank 360. If desired, level indicator rod 376 may have markings or calibrations thereon for accurately indicating the level of un-dissolved salt 378 at the bottom of tank 360. Thus, brine solution forms a brine solution layer 372 atop un-dissolved salt layer 378. Fresh water from a local municipal water supply is provided by a fresh water line 1073 (house water supply) to interior volume 370 of brine tank 360 and will reside as a layer 379 atop brine solution 372. Tank 360 may be manufactured in the shape of a parallelepiped, cylinder, octahedron, or any other convenient shape depending on space configurations and limitations at site 315. By way of example only, and not by way of limitation, tank 360 may have a parallelopiped shape with exterior dimensions of 46 inches high and a transverse cross section of 18 inches by 12 inches. Brine solution 372 contains the aforementioned chloride composition that can be corrosive. Therefore, tank 360 is desirably manufactured from a non-corrosive material, such as fiberglass or any of the non-corrosive materials mentioned hereinabove with respect to water recirculation loop 320.

Still referring to FIGS. 1 and 2, and as described in detail hereinbelow, system 300 includes an electrolytic chlorine generation cell, generally referred to as 380 (see FIG. 5), for electrochemically generating chlorine from the chloride composition dissolved in brine solution 372. In this regard, chlorine is generated by electrolysis according to the following well-known chemical formulae depending on whether the brine solution comprises sodium chloride or potassium chloride:

Sodium chloride+Water→Chlorine+Hydrogen+Sodium hydroxide      Eq. (1)

$2NaCl + 2H_2O \rightarrow Cl_2 + H_2 + NaOH$      Eq. (2)

or

Potassium chloride+Water→Chlorine+Hydrogen+Potassium hydroxide      Eq. (3)

$2KCl + 2H_2O \rightarrow Cl_2 + H_2 + KOH$      Eq. (4)

Figure 6:
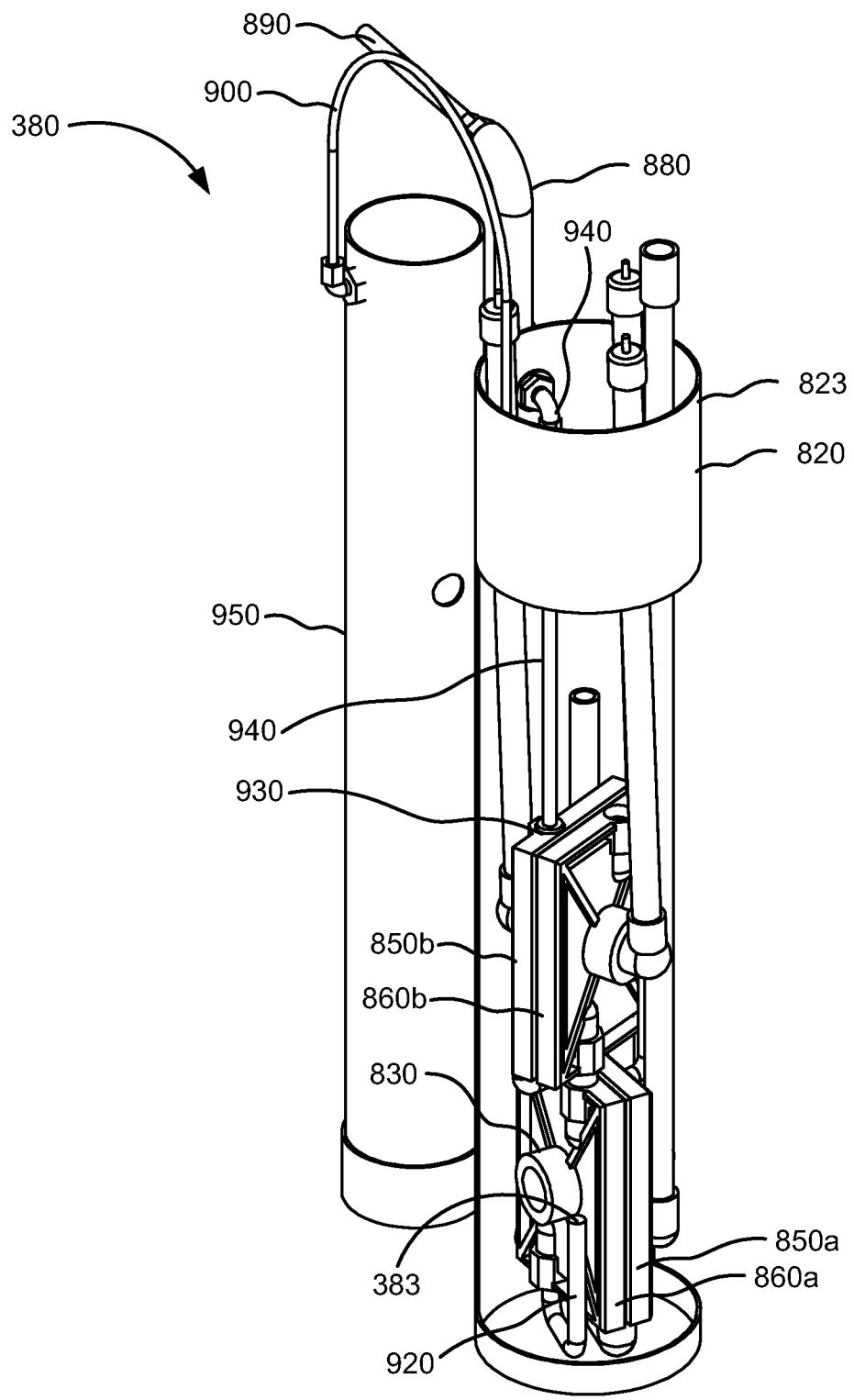
FIG. 6 is a view in perspective and partial vertical section of an anode side of the electrolytic chlorine generation cells that are disposed in the container, this view also showing the precipitation tank.

Referring again to FIGS. 1 and 2, chlorine generation cell 380 receives brine solution 372 through an intake opening 383 (see FIG. 6). Chlorine generation cell 380 also includes a chlorine exit tube 890 (see FIG. 6) for exit of chlorine gas. The chlorine gas is mixed with re-circulating water flowing in water supply line 340 by means of a mixer 895, which is coupled to water return line 350. Chlorinated re-circulating water is formed while the chlorine gas mixes with the re-circulating water from water supply line 340. The mixer 895 is coupled to water return line 350 for reasons provided hereinafter. Configurations of chlorine generation cell 380 is described in more detail hereinbelow.

Figure 3:
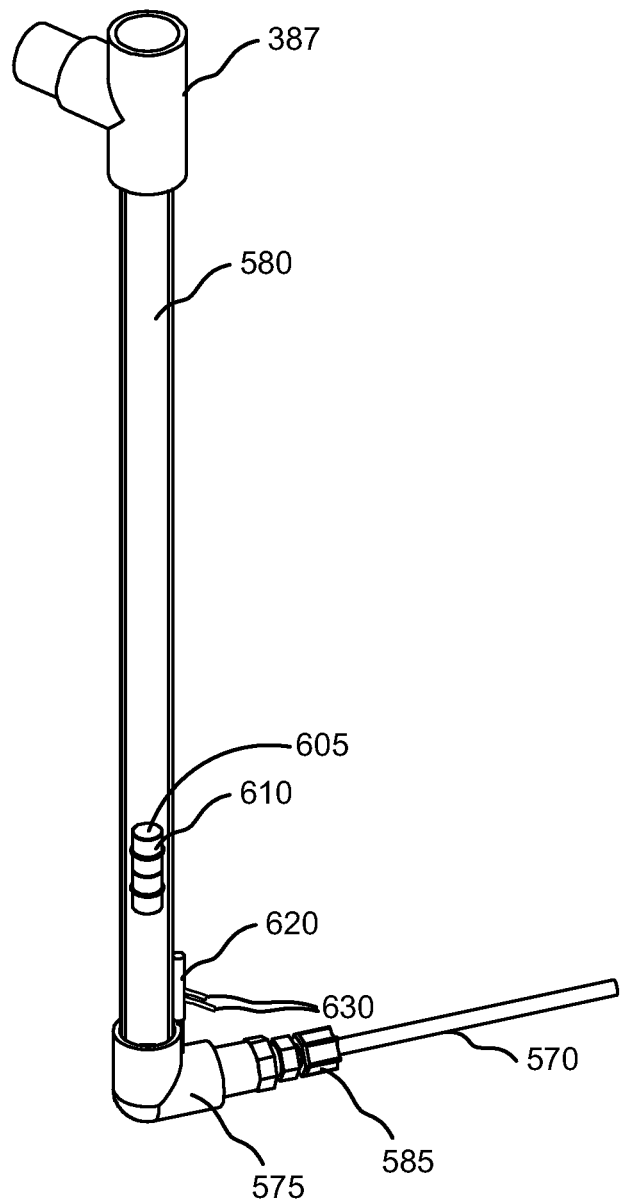
FIG. 3 is a view in perspective and partial vertical section of a suction flow switch.
Figure 4:
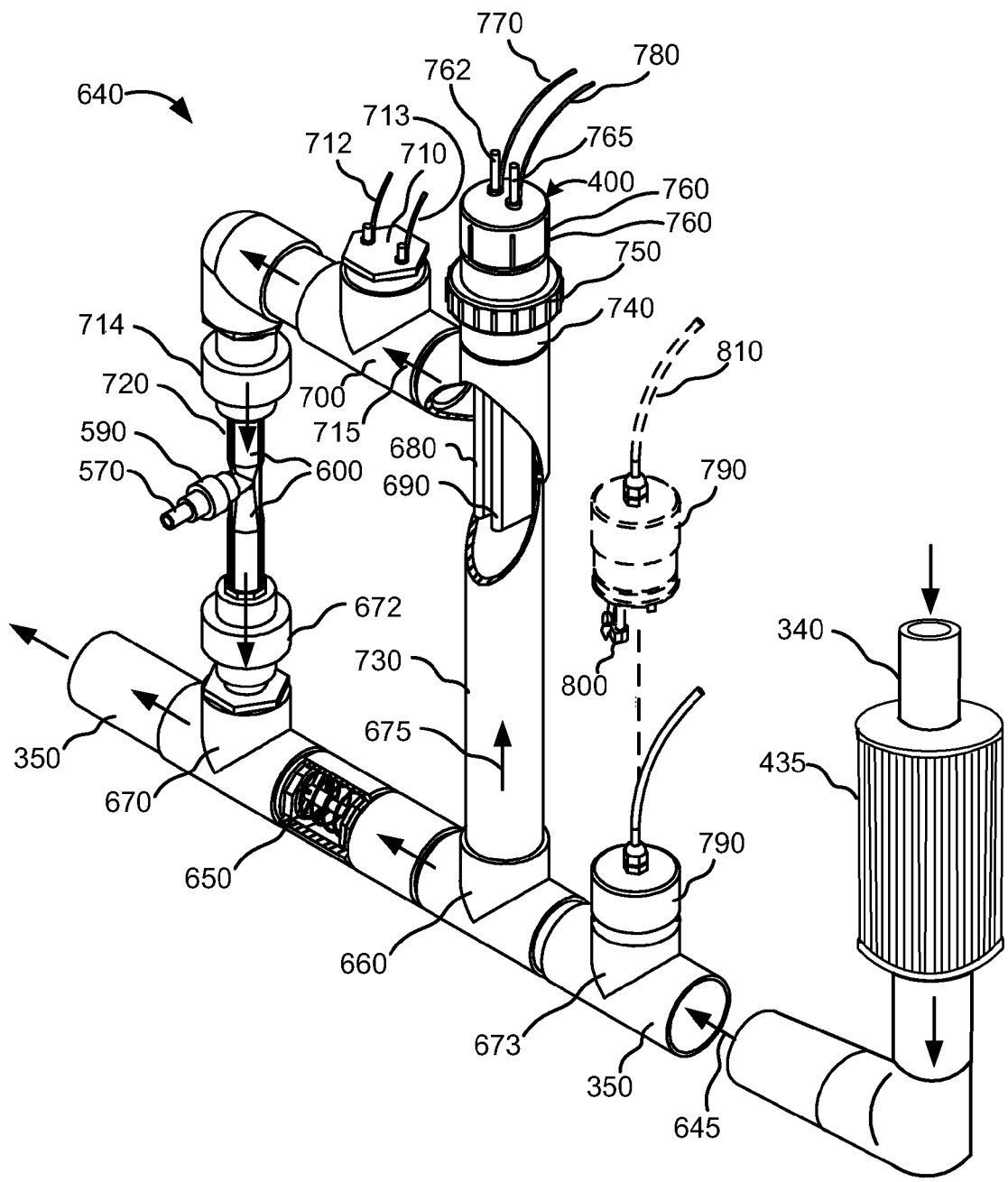
FIG. 4 is a view in perspective and partial vertical section of a venturi tube, a manifold loop coupled to the venturi tube, and a copper/silver ionization cell coupled to the manifold loop.

Referring to FIGS. 3 and 4, and as described in detail hereinbelow, system 300 includes an electrolytic copper/silver ionization cell, generally referred to as 400 (FIG. 4). Copper/silver ionization cell 400 is coupled to water return line 350 for generating a multiplicity of copper/silver ions deliverable to the re-circulating chlorinated water flowing in water return line 350. In this manner, water return line 350 allows mixing of the copper/silver ions and the re-circulating chlorinated water. The copper/silver ions and the re-circulating chlorinated water combine to sanitize the re-circulating water. In this manner, body of water 310 is sanitized while the re-circulating water is sanitized. Configuration of copper/silver ionization cell 400 is described in more detail hereinbelow.

Referring to FIGS. 1, 2, and 4, a power supply, generally referred to as 410 (FIG. 2), is coupled to chlorine generation cell 380 by a first electrical connection (not shown) and also coupled to copper/silver ionization cell 400 by a second electrical connection for respectively supplying electrical power to chlorine generation cell 380 (FIG. 6) and copper/silver ionization cell 400. The second electrical connection includes at least one wire lead 415 that extends from power supply 410 to copper/silver ionization cell 400 in order to supply the electrical power to copper/silver ionization cell 400. Thus, power supply 410 electrically operates chlorine generation cell 380 and copper/silver ionization cell 400 while power supply 410 supplies electric power to chlorine generation cell 380 and copper/silver ionization cell 400. Desirably, power supply 410 independently supplies electrical power to chlorine generation cell 380 and copper/silver ionization cell 400, such that power supply 410 is capable of independently operating chlorine generation cell 380 and copper/silver ionization cell 400. In other words, power supply 410 is adapted to operate chlorine generation cell 380 and copper/silver ionization cell 400 independently of each other. Also, power from power supply 410 is adjustable. To obtain this result, power supply 410 includes an integrally attached programmable first timing device 420 and an integrally attached programmable second timing device 425 for programming timed supply of electrical power to chlorine generation cell 380 and copper/silver ionization cell 400, respectively. Timing operation of chlorine generation cell 380 controls duration of when chlorine generation cell 380 is in an "on" state. Controlling duration of when chlorine generation cell 380 is in an "on" state, in turn, controls the amount of chlorine gas released from chlorine generation cell 380. Similarly, timing operation of copper/silver ionization cell 400 controls duration of when copper/silver ionization cell 400 is in an "on" state. Controlling duration of when copper/silver ionization cell 400 is in an "on" state, in turn, controls the amount of copper/silver ions released from copper/silver ionization cell 400. In this manner, the ratio of chlorine and copper/silver ions delivered to body of water 310 can be controlled to obtain a customized sanitation treatment plan for specific body of water 310.

Referring again to FIGS. 1, 2 and 4, a pump 430 is disposed in water supply line 340 for pumping and re-circulating water through water recirculation loop 320. Pump 430 may be either a constant speed or variable speed pump, as desired. Pump 430, which is connected to an external power source (not shown), is selected to provide a desired mass flow rate through water recirculation loop 320. By way of example only, and not by way of limitation, pump 430 may have a horse power (HP) of about 0.5 HP to about 3.0 HP for a typical residential in-ground swimming pool and may have a horse power of about 0.5 HP to about 2.0 HP for a typical residential above-ground swimming pool. Required horsepower will depend on size of the pool, time during which the pump is operated, whether the pump is a constant speed or a variable speed pump, filtration system used and other operating factors. Also, if desired, pump 430 may be coupled to first timing device 420, second timing device 425 or another timing device (not shown) for timed operation of pump 430. In addition, a filter 435 is disposed in water supply line 340 for filtering water being pumped through water recirculation loop 320, so as to remove particulate matter and debris from water flowing in water recirculation loop 320. In this regard, filter 435 includes sand, diatomaceous earth, fiberglass, paper, a synthetic membrane or other suitable filter media.

As best seen in FIG. 2, there is shown system 300 in greater detail. Power supply 410, which is a low voltage direct current (DC) power supply, includes a sealed housing or cabinet 440 enclosing power supply electronics (not shown). Sealed cabinet 440, which may be aluminum for weight reduction and corrosion resistance, protects the enclosed power supply electronics from dust, moisture, and corrosive fumes that may be present. Also, walls of cabinet 440 are of a suitable gauge or thickness for conductively radiating a portion of the heat generated by the enclosed electronics away from cabinet 440. By way of example only, and not by way of limitation, the amount of voltage input to power supply 410, such as from household current, can be about 110/220 voltage alternating current (VAC). Power supply 410 is adapted to convert the alternating current to direct current (DC) that is required to properly operate chlorine generation cell 380 and copper/silver ionization cell 400. By way of example only, and not by way of limitation, the amount of DC low voltage output from power supply 410 can be from about 1.0 volt to about 12.0 volts depending on volume of body of water 310, chemistry of body of water 310, level of sanitization desired and other factors.

Referring to FIG. 2, programmable first timer 450 is coupled to power supply 410 for timing operation of power supply 410 while power supply 410 supplies power to chlorine generation cell, or cells, 830 (see FIG. 6). In this manner, power supply 410 supplies timed electrical power to chlorine generation cell 830 while first timer 450 times operation of power supply 410. In addition, programmable second timer 460 is coupled to a second power supply 411 (FIG. 2) contained in aluminum cabinet 440 for timing operation of second power supply 411 which supplies power to copper/silver ionization cell 400 (FIG. 4). In this manner, power supply 411 supplies timed electrical power to copper/silver ionization cell 400 while first timer 450 times operation of power supply 410. In other words, power supply 410 independently supplies timed electrical power to chlorine generation cell, or cells, 830. Timer 460 independently supplies timed electrical power to power supply 411 which gives power to copper/silver ionization cell 400 to independently operate copper/silver ionization cell 400 for desired periods of time. Both timers 450/460 may be 24-hour timers, if desired. If only the first timer 450 is desired, then, while timer 450 is in the "on" position, an adjustable percentage circuit (not shown) will control the amount of power delivered to the copper/silver ionizing cell 400. If desired, first timer 450 and second timer 460 may each be a commercially available mechanical timer capable of being manually dialed to set the timing duration. Independently supplying electrical power to chlorine generation cell 380 and copper/silver ionization cell 400, as well as controlling duration of electrical power delivered to chlorine generation cell 380 and copper/silver ionization cell 400, provides substantial control over the ratio of chlorine and copper/silver ions in water recirculation loop 320. Controlling the ratio of chlorine and copper/silver ions in water recirculation loop 320 allows for customizing and optimizing water sanitation to meet the specific sanitation requirements of a given swimming pool, drinking water supply, or other body of water.

Still referring to FIG. 2, power supply 410 further includes a first voltage meter 470 coupled to first electrical connection (not shown) for measuring and displaying voltage being applied to chlorine generation cell 830 (see FIG. 6). In addition, power supply 410 includes a second voltage meter 480 coupled to second electrical connection 415 for measuring and displaying voltage being applied to copper/silver ionization cell 400. Although not critical, it is nonetheless important that voltage being delivered to chlorine generation cell 380 and copper/silver ionization cell 400 be measured and displayed in order to confirm proper operation of chlorine generation cell 380 and copper/silver ionization cell 400. Confirming proper operation of chlorine generation cell 380 and copper/silver ionization cell 400, in turn, confirms that the desired ratio of chlorine and copper/silver ions is supplied to the re-circulating water. Power supply 410 also includes a slow-blow fuse holder 490 for holding a slow-blow fuse that is coupled to the electronics within cabinet 440 for protecting the electronics within cabinet 440 from damage. The slow-blow fuse withstands excessive current for a short time period before it opens and, thus, interrupts the excessive current. The slow-blow fuse will withstand up to 10 times its normal operating current for a short time period in order to protect the power supply electronics, if the power supply electronics draw a large initial current. Power supply 410 also includes a manually operated push-button 500 coupled to a solenoid valve 510 for activating solenoid valve 510. The solenoid valve 510 is capable of pressurizing an acid reservoir 520 that is coupled to solenoid valve 510, such as by line 525. Acid reservoir 520 injects acid, such as hydrochloric acid (HCL) into chlorine generation cell 380 during the cleaning process. A first light emitting diode (LED) 530 is provided on cabinet 440 and is connected to copper/silver ionization cell 400. First LED 530 is capable of indicating positive polarity of copper/silver ionization cell 400. A second light emitting diode (LED) 540 is provided on cabinet 440 and is connected to copper/silver ionization cell 400. Second LED 540 is capable of indicating negative polarity of copper/silver ionization cell 400. A third LED 550 is provided on cabinet 440 and is connected to copper/silver ionization cell 400. Third LED 550 is capable of indicating that copper/silver ionization cell 400 is in a "power-on" state, such that copper/silver ionization cell 400 is receiving electrical power to operate copper/silver ionization cell 400. A cover 555 is pivotally connected to cabinet for covering first timer 450, second timer 460, first voltage meter 470, second voltage meter 480, slow blow fuse holder 490, button 500, first LED 530, second LED 540 and third LED 550 to protect these components from damage or inadvertent activation while system 300 is left unattended. For this purpose cover 555 is adapted to pivot bi-directionally as shown by a double-headed arrow 557.

As shown in FIGS. 2, 3 and 4, a vertically-oriented, tubular flow switch 560 is connected to tank 360 at one end of flow switch 560 and to a suction line 570 at the other end of flow switch 560 by means of a bottom elbow fitting 575. The flow switch 560 includes a vertically-oriented tubular member 580 (FIGS. 2, 3), so that chlorine-bearing fluid travels downwardly through tubular member 580 and through bottom elbow fitting 575, the chlorine-bearing fluid exiting bottom elbow fitting 575 then flowing into suction line 570 by means of a chlorine exit fitting 585 interconnecting bottom elbow fitting 575 and suction line 570. The suction line 570, which extends to a suction fitting 590 (FIG. 4) belonging to a venturi 600 (FIG. 4), may be formed of "TEFLON®". Use of "TEFLON®" is particularly desirable because "TEFLON®" will not chemically react with the chlorine-bearing fluid and will resist corrosion by the chlorine-bearing fluid. The mark "TEFLON®", which comprises polytetrafluoroethylene (PTFE), is a registered trademark of E. I. du Pont de Nemours and Company located in Wilmington, Del. U.S.A.

Referring again to FIGS. 2 and 3, disposed in tubular member 580 is a floating actuator 605. The actuator 605 includes a magnet 610 sealed within it. As fluid is suctioned out of tubular member 580, actuator 605 descends to its lowest level, which is at bottom elbow fitting 575. Attached to bottom elbow fitting 575 is a copper/silver reed switch 620 (FIG. 3) that draws to a closed position when magnet 610, that is included with actuator 605, descends in tubular member 580 to a position adjacent to reed switch 620. One or more wire leads 630 extend from reed switch 620 to power supply 440, such that when reed switch 620 closes, power supply 440 is activated. If, for any reason, suction from suction line 570 is interrupted, such as suction line 570 (see FIG. 4) becoming clogged or obstructed due to build-up of particulate matter therein, then fluid builds-up in tubular member 580. As fluid builds-up in tubular member 580, actuator 605 upwardly floats in tubular member 580. As actuator 605 floats upwardly in tubular member 580, magnet 610 is lifted away from its position adjacent to reed switch 620. As magnet 610 lifts away from its position adjacent to reed switch 620, the reed switch 620 opens to thereby deactivate power supply 440.

With reference to FIG. 4, a manifold loop, generally referred to as 640, includes previously mentioned copper/silver ionization cell 400 and previously mentioned venturi 600. Manifold loop 640 receives water from water return line 340 in the direction of a directional arrow 645. Manifold loop 640 receives the water after the water passes through filter 435, so that water entering copper/silver ionization cell 400 is particulate-free in order to avoid interference with and contamination of the copper/silver ionization process occurring in copper/silver ionization cell 400. Manifold loop 640 also includes a flow restrictor 650 disposed in water return line 350 between a first upstream tee 660 belonging to manifold loop 640 and a downstream tee 670 also belonging to manifold loop 640. Extending upwardly from downstream tee 670 and connected thereto is a union or coupler 672 that connects venturi 600 to downstream tee 670 and, thus, connects venturi 600 to water return line 350. Coupler 672 is adapted to allow removal of venturi 600 for service or replacement. A second upstream tee 673 that also belongs to manifold loop 640 is provided for reasons to be stated momentarily. Flow restrictor 650 forces a portion of the water flowing upwardly through first upstream tee 660 in the direction of a directional arrow 675. After the portion of water is forced upwardly by flow restrictor 650, the water comes into contact with a first sacrificial electrode 680 having a silver (Ag) and a copper (Cu) composition. In addition, the water also comes into contact with a second sacrificial electrode 690 also having a silver and a copper composition. Although electrodes 680/690 both include silver and copper, electrodes 680/690 are mostly silver with a smaller amount of copper. The desired amounts of silver and copper in each electrode 680/690 can be determined by a person of ordinary skill in the art of water sanitation techniques without undo experimentation. For example, electrodes 680/690 may each contain about 91% copper and about 9% silver. It should be appreciated by a person of ordinary skill in the art of water sanitation techniques that the copper and silver content of electrodes 680/690 need not be pure silver and pure copper. Rather, electrodes 680/690 may contain alloys of silver and copper, if desired. Also, it should be appreciated that size of electrodes 680/690 can vary depending on the amount of body of water 310 being treated. In addition, it should be appreciated that, although only one pair of electrodes 680/690 is shown for purposes of illustration, there may be multiple pairs of electrodes depending on volume of water to be sanitized and level of sanitation desired. The useful life of the two electrodes (i.e., Ag and Cu) used in the copper/silver ionization cell is increased because the electrodes 680/690 are made out of the same material and then electrically reversing the polarity according to a pulsating program that controls the timing of the pulses. Operation of electrodes 680/690 and the manner in which electrodes 680/690 kill microorganisms are described in more detail hereinbelow.

In addition, system 300 further includes a reverse osmosis unit 695 (FIG. 2) coupled to the outside of brine tank 360 (FIG. 2) for concentrating impurities from the water. In this regard, reverse osmosis unit 695 removes about 80% to about 90% of hardness minerals. System 300 also includes a pre-sediment filter 697 (FIG. 2) that includes a replaceable filter cartridge (not shown) for removing sediment from the water.

As previously mentioned, copper/silver ion generation cell 400 includes at least one pair of electrodes 680/690 each comprising copper and silver copper/silver. for generating positively copper ions ($Cu^{2+}$) and silver ions ($Ag^+$) by electrolysis. The positively charged copper ions will seek-out particles of opposite polarity, such as bacteria, viruses, and fungi. The copper ions form electrostatic compounds with the negatively charged cell walls of the microorganisms. The compounds disrupt the permeability of the cell wall and cause failure of nutrient uptake by the cell. Thereafter, the copper ions penetrate the cell wall of the microorganism and create an entrance for silver ions generated by electrodes 680/690. The silver ions penetrate the center of the microorganism and bond to parts of the cell, such as the deoxyribonucleic acid (DNA) and ribonucleic acid (RNA) in the cell of the microorganism. Bonding of the silver ions to parts of cell of the microorganism causes life-support in the cell to cease. In this manner, there is no longer cell division and cellular growth of the microorganism. Absence of cell division and cellular growth causes the microorganisms to cease multiplying, so that the population of microorganisms die-out over time.

Still referring to FIG. 4, after the re-circulating water contacts electrodes 680/690, the water enters a tubular member tee 700 to which an electrical conductivity sensor 710 is connected. Venturi 600 is coupled to the top of tubular member tee 720, such as by a union or coupler 714. Conductivity sensor 710 is electrically connected to power supply 410 by a first wire lead 712 and a second wire lead 713.

As seen in FIG. 4, the water flows in the direction of directional arrow 715, as the water enters tubular member tee 700 and then flows past conductivity sensor 710. The conductivity sensor 710 is capable of sensing conductivity of the water flowing past conductivity sensor 710. As used herein, the terminology "conductivity", with respect to water, is defined to mean a measure of electrical conductivity of the water for the purpose of determining the volume of total dissolved solids in the water. It is important to maintain the amount of all dissolved solids in the water below a predetermined level (e.g., 1,500 ppm) in order to avoid staining of pool surfaces, hard water, scaling, salty Taste, cloudy pool water and other undesirable effects.

Referring to FIGS. 1, 3 and 4, after passing conductivity sensor 710, the water downwardly flows through union 714 and through previously mentioned venturi 600 that is installed between union 714 and union 672. Water flowing through venturi 600, which increases speed of water flow and decreases static pressure of the water flow, creates suction due to the well-known Bernoulli Effect. Previously mentioned venturi suction fitting 590 is connected to chlorine generation cell 830 (see FIGS. 5 and 6).

As shown in FIGS. 1, 3 and 4, the chlorine exiting chlorine generation cell 830 is suctioned through suction line 570 and into venturi 600. The chlorine then mixes with the filtered re-circulating water having dissolved therein the copper/silver ions generated by electrodes 680/690. The water so-treated then returns through downstream tee (T) 670 that is downstream from flow restrictor 650 and is delivered to the water being treated through water return line 350. Copper/silver ionization cell 400, which is desirably formed from PVC to resist corrosion and microbial growth, includes a housing 730 that is connected at a bottom portion thereof to first upstream tee 660, and at a top portion thereof to an upper tee 740 located at a top portion of manifold loop 640. Extending upwardly from upper tee 740 and connected thereto is a union or coupler 750. Coupler 750 is adapted to allow removal of electrodes 680/690 for service or replacement. Mounted atop coupler 750 and connected thereto, such as by being threadably connected thereto, is a removable cap 760 desirably formed from PVC to resist corrosion and microbial growth. Extending through cap 760 and attached thereto is a first electrode stud 762 connected to first electrode 680 and a second electrode stud 765 connected to second electrode 690. First electrode stud 762 and second electrode stud 765 may be threadably connected to first electrode 680 and second electrode 690, respectively, so that electrodes 680/690 may be replaced, if needed.

Alternatively, studs 762/765 may be potted into the cap 760. In this case, when electrodes 680/690 wear down, the entire cell is replaced. Replacement of electrodes 680/690 may be necessary due to corrosion or fouling thereof. A first wire lead 770 is connected to first electrode stud 762 and a second wire lead 780 is connected to second electrode stud 765. Both of first wire lead 770 and second wire lead 780 extend to power supply 410 (FIG. 2) for receiving programmed (i.e., adjustable) electrical power from power supply 410.

Referring to FIGS. 1 and 4, it should be understood from the teachings herein that, as previously mentioned, programmed (i.e., adjustable) electrical power is delivered to electrodes 680/690. Copper/silver ionization cell 400 is timed separately or independently of chlorine generation cell 380 (FIG. 5) for maximum control over the water chemistry by controlling the ratio of chlorine to copper/silver ions. Previously mentioned manifold loop 640 also includes a PVC flow sensing switch 790 coupled to water return line 350 at previously mentioned second upstream tee 673. Flow sensing switch 790 includes at least one sensor 800 adapted to be in fluid communication with the water in water return line 350 in order to sense presence of water flow in water return line 350. Flow sensing switch 790 further includes a wire lead 810 connected to sensor 800 at one end thereof and to power supply 410 at the other end thereof for supplying electrical power to sensor 800 and for sending a return signal to power supply 410 if insufficient water flow is sensed in water return line 350. In the event power supply 410 receives an insufficient water flow signal from sensor 800; then, in such event, power supply 410 will cease supplying electrical power to chlorine generation cell 380 and copper/silver ionization cell 400 to stop operation of chlorine generation cell 380 and copper/silver ionization cell 400.

Figure 5:
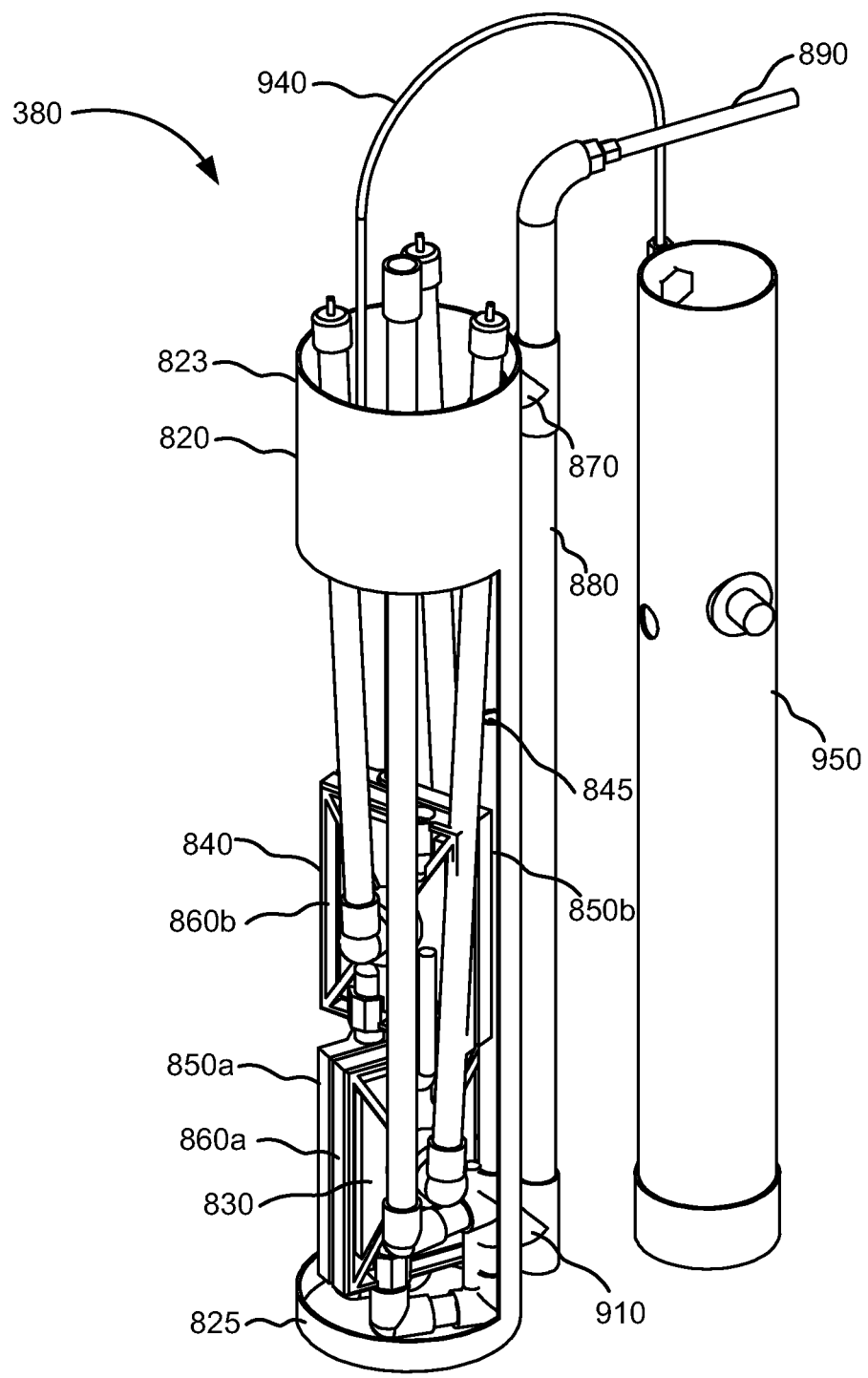
FIG. 5 is a view in perspective and partial vertical section of a plurality of electrolytic chlorine generation cells disposed in an upright tubular container that is adapted to be placed in the brine tank, this view also showing a dewatering device coupled to the container and to a precipitation tank.

With reference to FIGS. 5 and 6, an upright tubular container 820 has an open upper end 823 and a closed lower end 825. Disposed in tubular container 820 is a first chlorine production device 830 disposed near closed lower end 825. Chlorine gas is produced by first chlorine production device 830. When additional chlorine is needed, a second chlorine production device 840 can be coupled to the first chlorine production device 830. The chlorine gas is directed to second chlorine production device 840, which is disposed above first chlorine production device 830. First chlorine production device 830 and second chlorine production device 840 are adapted to generate chlorine gas by electrolysis of brine solution 372 through an opening 845 formed in first tubular container 820. Each of first chlorine production device 830 and second chlorine production device 840 includes a positively charged anode plate installed in a housing 850a and 850b, respectively, that attracts electrons or anions. In addition, each of first chlorine production device 830 and second chlorine production device 840 includes a negatively charged cathode plate installed in another housing 860a and 860b, respectively, that attracts positively charged cations.

Still referring to FIGS. 5 and 6, the chloride ions in the sodium chloride brine solution 372 oxidize at anode plates 850a/850b to generate chlorine gas. Hydrogen gas and hydroxide ions are generated at cathode plate 860a/860b. In the case when sodium chloride brine is used, the chlorine gas, hydrogen gas and sodium hydroxide ions are produced by the well-known chemical reaction provided by Equations (1) and (2) presented hereinabove. It should be appreciated that a similar chemical reaction occurs in first chlorine production device 830 and second chlorine production device 840, if brine solution 372 comprises potassium chloride, as shown by Equations (3) and (4) presented hereinabove.

It should be appreciated that, when the chlorine cell is submerged in the brine solution 372, the gasses formed on both the anode and cathode electrodes rise upwardly and push unused brine water on the anode side and mostly fresh water on the cathode side up through the "TEFLON®" tubing causing a pumping action. On the anode side the chlorinated liquid is directed to dewatering device 880 (see FIG. 5) where the unused brine water falls back to the bottom of the brine tank 360 and the chlorine gas rises to the top of dewatering device 880 and is directed to the previously mentioned mixer 895 (not shown).

Referring again to FIGS. 5 and 6, chlorine is generated in first chlorine production device 830. The chlorine gas flows upwardly to second chlorine production device 840 from anode plate 850a of first chlorine production device 830. Chlorine is generated in second chlorine production device 840, as well. The chlorine gas generated by second chlorine production device 840 also flows upwardly from anode plate 850b. Both chlorine gas streams are directed through a fitting 870 and then to a dewatering device 880. Chlorine gas and any oxygen that may be present are separated from any bio-solids in the water. The chlorine gas rises to the top of dewatering device 880 and is directed by tube 890 to the mixing chamber (not shown). Unused brine solution drops down dewatering device 880 and exits a fitting 910 to be recycled.

Referring yet again to FIGS. 5 and 6, an intake conduit 920, which is coupled to first anode plate 850a and second anode plate 850b, receives brine from brine solution 372, so that the brine solution 372 can be provided to first anode plate 850a and second anode plate 850b. Intake conduit 920 also extends upwardly for preventing foreign material from entering intake conduit 920. The brine travels to anode plates 850a and 850b. Chlorine gas, hydrogen gas and liquid from cathode plates 860a and 860b exit upper end 823 of through a fitting 930. The chlorine is then directed through tube 940 and into a precipitation tank 950.

Figure 7:
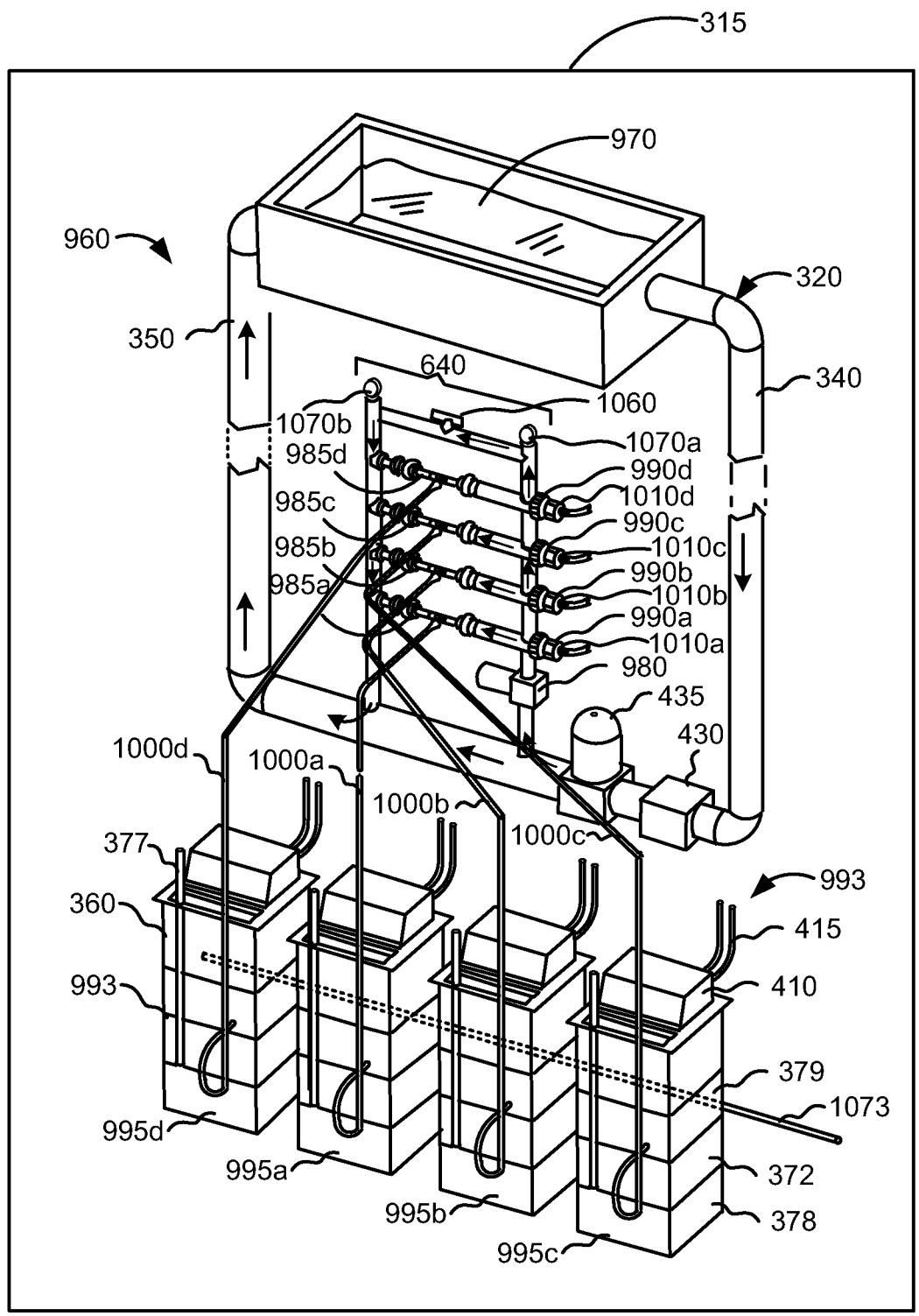
FIG. 7 is a schematic representation, with parts removed for clarity, of a second embodiment on-site chlorine generation and copper/silver ionization system including a booster pump for sanitizing a larger body of water.
Figure 8:
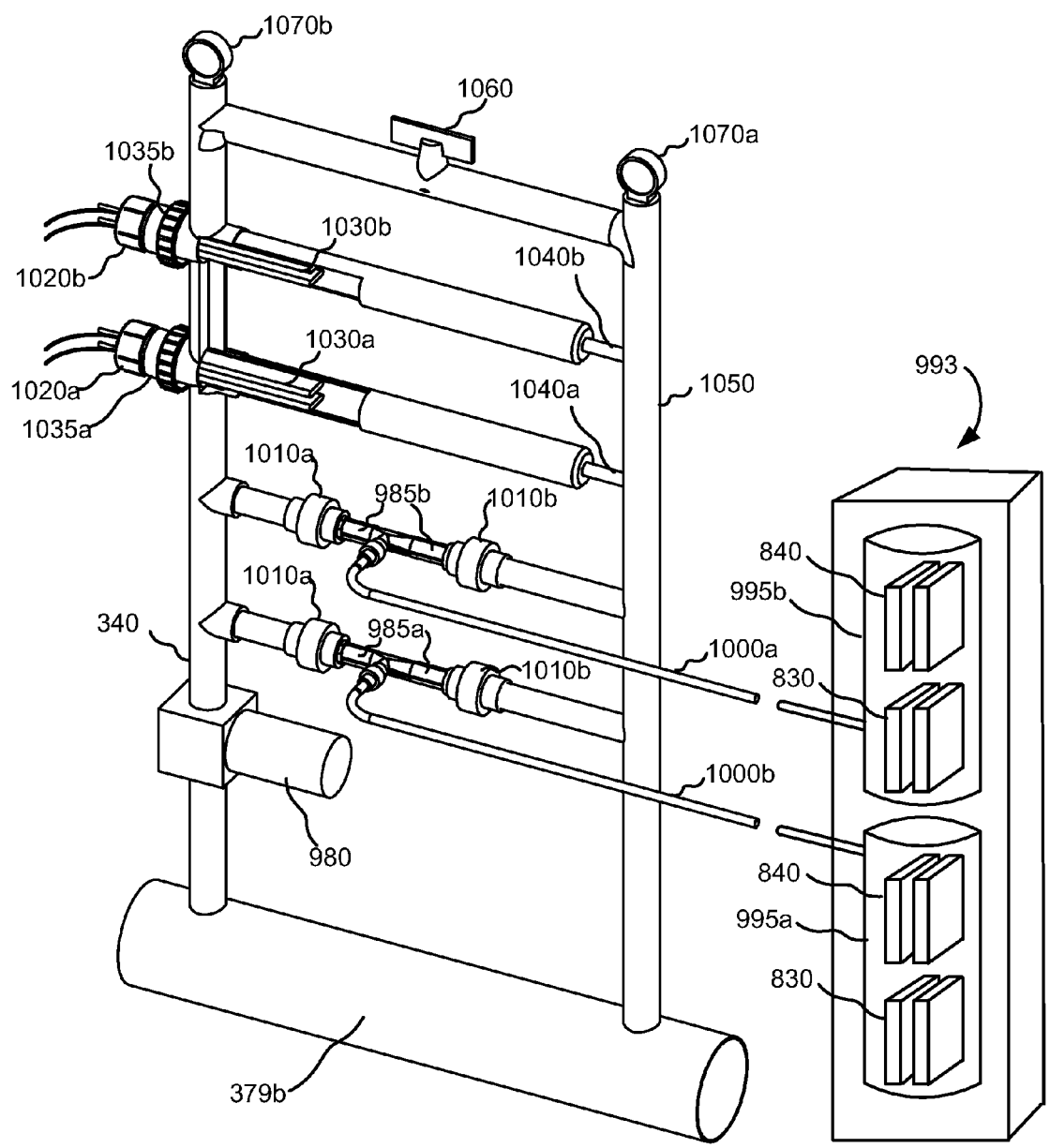
FIG. 8 is a view in perspective and partial horizontal section of a plurality of venturi tubes and copper/silver ionization cells, wherein water is supplied by the booster pump.

Referring to FIGS. 7 and 8, there is shown, with parts removed for clarity, a second embodiment advanced on-site chlorine generation and copper/silver ionization system, generally referred to as 960 (hereinafter "system 960"), for sanitizing a larger body of water 970, such as a commercial or public swimming pool or municipal drinking water supply for a large municipality or city. In this regard, system 960 includes a booster pump 980 and a plurality of ventures, such as a first venturi 985a, a second venturi 985b, a third venturi 985c, and a fourth venturi 985d, for reasons provided presently. Booster pump 980 provides increased water mass flow rate for sanitizing the larger body of water 970.

System 960 also includes a plurality of electrolytic copper/silver ionization cells, such as a first copper/silver ionization cell 990a, a second copper/silver ionization cell 990b, a third copper/silver ionization cell 990c and a fourth copper/silver ionization cell 990d. Each copper/silver ionization cell 990a/990b/990c/990d is connected to its respective chlorine generator, 995a, 995b, 995c, 995d. In this exemplary embodiment, there are four chlorine generators as follows: first chlorine generator 995a, second chlorine generator 995b, third chlorine generator 995c and fourth chlorine generator 995d. Booster pump 980 draws filtered water from water return line 350 and directs the water to water supply line 340. A portion of the water is directed through ventures 985a/985b/985c/985d that draw chemicals from the bank of chlorine generators, generally referred to as 993.

The bank of chlorine generators 993 includes a first chlorine generator 995a, a second chlorine generator 995b, a third chlorine generator 995c, and a fourth chlorine generator 995d. The chemicals that are drawn by venturies 985a/985b/985c/985d (FIG. 7) flow through a first suction line 1000a, a second suction line 1000b, a third suction line 1000c, and a fourth suction line 1000d, respectively. Each venturi 985a/985b/985c/985d is installed with a plurality of unions 1010a,

1010b, 1010c, 1010d, respectively, that enable any of venturies 985a/985b/985c/985d to be easily removed for replacement or service. A portion of the filtered water is also directed across the plurality of electrolytic copper/silver ionization cells 1020a and 1020b (FIG. 8). Each of copper/silver ionization cells 1020a and 1020b includes copper/silver electrodes 1030a and 1030b, as shown. Each copper/silver ionization cell 1020b, 1020b is installed with its respective union 1035a and 1035b for ease of replacement or service. On the downstream side of each copper/silver ionization cell 1020a, 1020b is an inline restrictor 1040a/1040/b, respectively, to provide backpressure for assuring that copper/silver ionization cells 1020a, 1020b are always flooded with water. A downstream return line 1050 returns the chemically treated water to main return line 350. A pressure regulating valve 1060 is installed between two pressure gauges, such as a first pressure gauge 1070a and a second pressure gauge 1070b, so that an operator of system 960 can ascertain water pressure and can adjust water flow between water supply line 340 and the downstream water return line 350.

Use of copper/silver ions can obtain several desirable effects. Based on the teachings herein, chlorine demand can be reduced by as much as 70% to 80% with the addition of copper and silver ions. In addition, although chlorine can escape from the water by volatilization, the copper and silver ions, on the other hand, will not escape from the water by volatilization. Further, the copper and silver ions are not affected by the pH of the water. The terminology "pH", as generally used herein, is a measure of the acidity and alkalinity of a solution, such as water having chlorine and copper/silver ions therein.

It is known that copper and silver ions cannot remove organic matter, such as skin tissue, hairs, urine, and skin flakes from water and act more slowly in killing bacteria and algae compared to other agents. However, the invention allows use of chlorine in addition to the copper and silver ions for sanitizing water having skin tissue, hairs, urine, and skin flakes therein. Also, it is known that, although copper and silver ions will stay in the water longer than most other sanitizing products, chlorine is faster in killing bacteria and algae than copper/silver ions. Therefore, it is believed the invention provides a useful, novel and nonobvious technique that uses chlorine in combination with copper/silver ions with a technique that efficiently and cost-effectively sanitizes a body of water. The two sanitation methods, in combination, greatly assist maintaining bodies of water, such as swimming pools and water in drinking water holding tanks, safe for human use.

Operation:

Operation of system 300 (FIG. 2) and system 960 (FIG. 7) will now be described. In this regard, water level in brine tank 360 is maintained by supplying local municipal utility water, which is softer than pool water. The water enters the unit through pre-sediment filter, 697, which will remove foreign particulate matter. The water is then directed through the unit's solenoid valve 510. When power supply 410 turns the unit on, water leaves the solenoid valve 510 and is directed through an aluminum heat exchanger or heat sink (not shown). The water then enters reverse osmoses filter 695, which separates the water into two streams. In one stream, about 25% of the water goes through reverse osmosis filter 695, which removes about 80% to about 90% of the hardness minerals. The other stream, about 75%, by-passes the reverse osmosis filter 695, picks up the mineral laden water from the reverse osmosis filter 695 resulting from the reverse osmosis process, and carries it to sealed mixing chamber 895 where chlorine gas and sodium hydroxide are combined with other chemicals to form a chlorinated liquid. The chlorinated liquid is then delivered to the pool through the chlorine exit fitting 585 (or 890 of FIG. 5) of the unit. The smaller stream (i.e., about 25% of the total stream volume) is directed into precipitation tank 950 (FIG. 5) where it is mixed with the effluent from the cathode side of the submerged cell. Because of the caustic nature of that water, most of the remaining hardness contained in the incoming water will precipitate to the bottom of precipitation tank 950. This water, now almost mineral free, combines with the un-dissolved salt at the bottom of brine tank 360 and goes through the submerged cell, the amount of mineral build-up on the cathode side of the cell is greatly reduced.

The submerged cell is enclosed in its own first tubular member 820 or cell container that protects the cell from being fouled by un-dissolved salt and also keeps chlorinated liquid from migrating throughout the bottom of brine tank 360.

To further protect the cell and keep the cell clean, a sealed acid cleaning reservoir 520, filled with acidic solution, is provided inside the brine tank 360. A second solenoid valve 515 (FIG. 1) is provided and is connected to household water line 1073 (FIG. 1). When that second solenoid valve 515 is activated, either manually or electronically, water is injected into the top of the acid cleaning reservoir 520 (FIG. 2), thus forcing a small amount of acid out of the bottom of the acid cleaning reservoir 520. A portion of the acid is directed to the cathode side of the cell and a portion is directed to the mixer 895, thus cleaning the unit, and its plumbing of hardness build-up and keeping the unit working at optimum efficiency as well as extending the service life of the unit. Since the acid used for cleaning eventually ends up being delivered to the pool, this process also aids in controlling the pH of the pool water.

Mounted on top of brine tank 360 is sealed cabinet 440, which may be aluminum, for containing a solid-state power supply. For purposes of convenience and brevity only, the terminology "power supply" means the electrical components housed within the cabinet 440, as well as the cabinet 440 itself. A digital timer 450 is mounted on the front of the aluminum cabinet 440. For commercial applications, a second solid-state power-supply is mounted inside the cabinet, and a second digital timer 460 is mounted on the front of the cabinet 440.

For commercial applications, one power supply delivers low voltage power to the submerged chlorine generating cell and the other power supply delivers low voltage power to inline copper/sliver ionizing cell electrodes 680/690. Each power supply is controlled by its own programmable timer 450, 460. Thus, the invention can supply a desired combination of sanitizing chemicals to the water being treated.

Briefly stated, copper/sliver cell electrodes 680/690 (FIG. 4) are mounted in pool return line 350 in such a way as to force water through the cell then loop it up and back through venturi manifold loop 640 and then back into return line 350. Flow restrictor 650 maintains a constant flow, and adjusts for different filter pump pressures. Venturi 600 is provided to draw the chlorinated liquid from the chlorine generator and inject it into the pool return water line 350. The invention installs easily and can be operated by an unskilled pool operator. It provide a unique combination of sanitizing chemicals at a much lower price than commercial products and delivers far less undesirable inert products to the body of water being treated.

Figure 9:
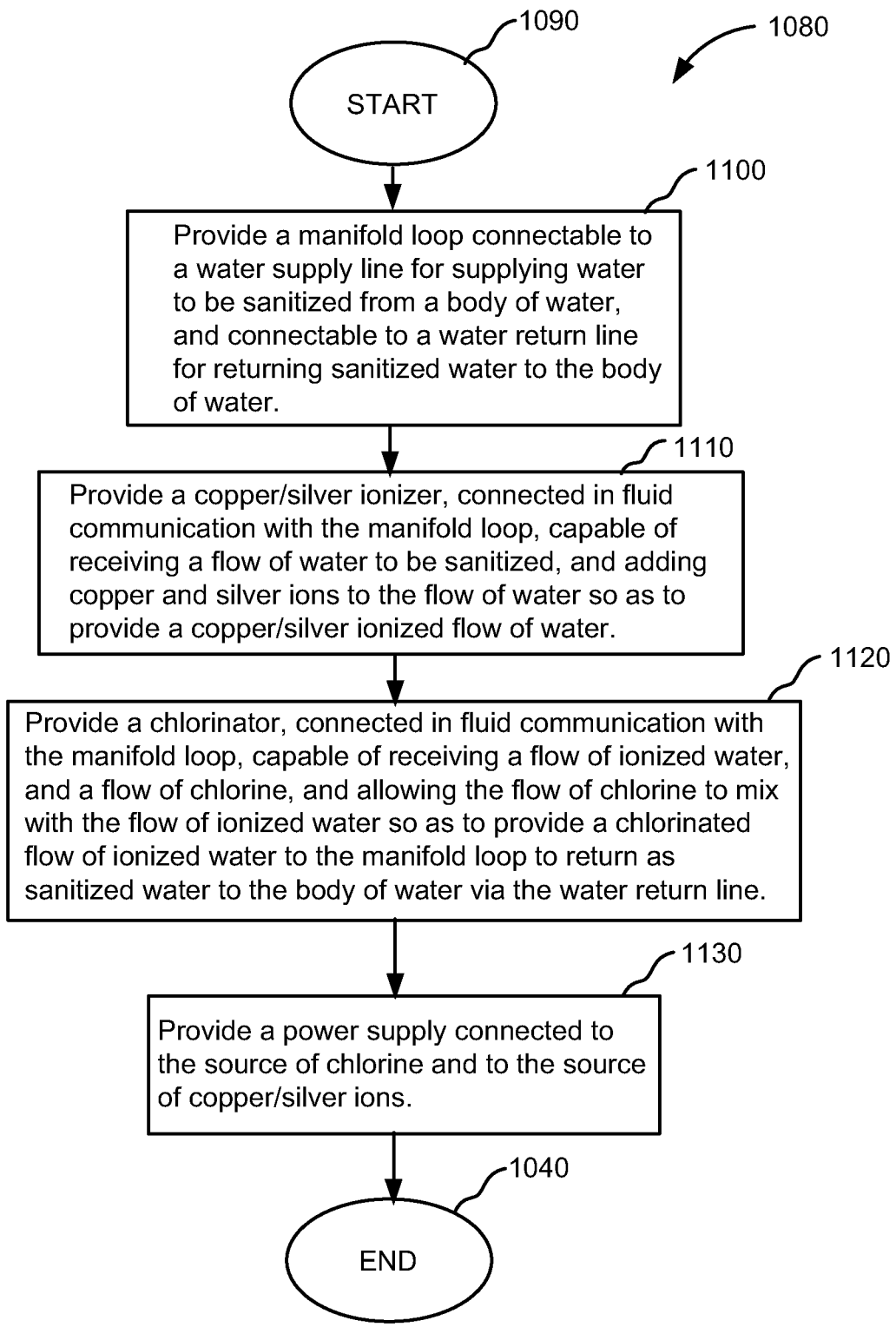
FIG. 9 is a flowchart showing an illustrative method of manufacturing the advanced on-site water sanitization system.

Illustrative Methods:

Referring to FIG. 9, an illustrative method, generally referred to as 1080, is provided for manufacturing an on-site chlorine generation and copper/silver ionization system for sanitizing a body of water. The method starts at a step 1090. At a step 1100 a tank is provided that is adapted to be disposed at a site having the body of water and adapted to contain a brine solution having a chloride composition. At a step 1110, a tank is provided that is adapted to be disposed at or near a site having the body of water and adapted to contain a brine solution having a chloride composition. At a step 1120, at least one suction tube drawing chemicals from the exit on the brine tank to a venturi in the venturi loop is provided. At a step 1130, a copper/silver ionization cell installed in the venturi loop is provided. At a step 1040, a power supply coupled to the chlorine generation cell and the copper/silver ionization cell is provided. The method stops at a step 1050.

Other modifications and implementations will occur to those skilled in the art without departing from the spirit and the scope of the invention as claimed. For example, system 960, that is intended for use in sanitizing larger bodies of water, such as commercial and public swimming pools, may be locked and secured in a separate building to prevent tampering by users of the commercial or public swimming pool.

What is claimed is:

1. A water sanitization system, comprising:
   a manifold loop configured to be connected to a water supply line to supply a flow of water to be sanitized from a body of water, and configured to be connected to a water return line to return a flow of sanitized water to the body of water;
   a copper/silver ionization cell, in fluid communication with the manifold loop, the copper/silver ionization cell configured to:
      receive, via the manifold loop, the flow of water to be sanitized, and
      add copper ions and silver ions to the flow of water to be sanitized to provide a flow of ionized water to the manifold loop;
   a chlorine generator, including a chlorine generation cell, configured to produce a flow of chlorine;
   a chlorinator, in fluid communication with the manifold loop, the chlorinator configured to:
   mix the flow of ionized water with the flow of chlorine to produce a flow of sanitized water having copper ions, silver ions, and chlorine, and
   supply the flow of sanitized water to the body of water via the manifold loop and the water return line; and
   a power supply electrically connected to the chlorine generation cell and to the copper/silver ionization cell, the power supply configured to selectively control a ratio of copper ions and silver ions to chlorine to be supplied to the flow of water to be sanitized.

2. The water sanitization system of claim 1, wherein the chlorinator is a venturi device configured to suck the flow of chlorine into the flow of ionized water.

3. The water sanitization system of claim 2, further comprising:
   a flow sensing device coupled to the venturi device to sense a flow of water through the venturi device.

4. The water sanitization system of claim 2, further comprising:
   a conductivity sensing device coupled to the venturi device to sense a conductivity of water flowing through the copper/silver ionization cell.

5. The water sanitization system of claim 1, wherein the chlorination includes a T-connector, through which the flow of chlorine is supplied into the flow of ionized water.

6. The water sanitization system of claim 1, wherein the chlorine generator comprises:
   a brine tank configured to contain a brine solution having at least one chloride compound dissolved therein, wherein the chlorine generation cell is configured to be submerged in the brine solution, and to generate chlorine from the at least one chloride compound.

7. The water sanitization system of claim 6, wherein the at least one chloride compound includes at least one of: sodium chloride, calcium chloride, or potassium chloride.

8. The water sanitization system of claim 1, wherein the power supply includes a timing device electrically connected to the chlorine generator and to the copper/silver ionization cell, the timing device configured to control the ratio of copper and silver ions to chlorine by independently controlling a supply of electrical power, from the power supply, to the chlorine generator and the copper/silver ionization cell.

9. The water sanitization system of claim 8, wherein the timing device includes:
   a first timer coupled to the power supply of the chlorine generator, the first timer configured to control a timing of electrical power to the chlorine generator; and
   a second timer coupled to the power supply connected to the copper/silver ionization cell, the second timer to control a timing of electrical power to the copper/silver ionization cell.

10. The water sanitization system of claim 1, further comprising:
    a water flow restrictor in fluid communication with both the water supply line and the water return line, the water flow restrictor configured to redirect the flow of the water to be sanitized from the water supply line to the manifold loop.

11. The water sanitization system of claim 1, wherein the manifold loop includes a pump configured to pull water to be sanitized from the water supply line, and to push the water to be sanitized into the manifold loop.

12. The water sanitization system of claim 1, wherein the copper/silver ionization cell includes:
    two identical electrodes formed of an alloy of copper and silver.

13. A water sanitization system, comprising:
    a manifold loop configured to be connected to a water supply line to supply a flow of water to be sanitized from a body of water, and configured to be connected to a water return line to return a flow of sanitized water to the body of water;
    a plurality of copper/silver ionization cells, in parallel fluid communication with the manifold loop, each copper/silver ionization cell, of the plurality of copper/silver ionization cells being configured to:
       receive, via the manifold loop, the flow of water to be sanitized, and
       add copper ions and silver ions to the flow of water to be sanitized, to provide a flow of ionized water to the manifold loop;
    one or more chlorine generators, each of the one or more chlorine generators including a chlorine generation cell, and each of the one or more chlorine generators configured to produce a flow of chlorine;
    a plurality of chlorinators, in parallel fluid communication with the manifold loop, each chlorinator, of the plurality of chlorinators, being configured to:
    mix the flow of ionized water with the flow of chlorine from one of one or more chlorine generators to produce a flow of sanitized water having copper ions, silver ions, and chlorine, and
    supply the flow of sanitized water to the body of water via the manifold loop and the water return line;

a power supply electrically connected to the chlorine generation cell of the one or more chlorine generators, and to each copper/silver ionization cell of the plurality of copper/silver ionization cells, the power supply configured to selectively control a ratio of copper and silver ions to chlorine supplied to the flow of water to be sanitized.

14. The water sanitization system of claim 13, wherein each chlorinator, of the plurality of chlorinators, is a venturi device configured to suck the flow of chlorine into flow of ionized water.

15. The water sanitization system of claim 13, wherein each chlorinator, of the plurality of chlorinators, includes is a T-connector, through which the flow of chlorine is supplied into the flow of ionized water.

16. The water sanitization system of claim 13, wherein each of the one or more chlorine generators is configured to provide the flow of chlorine to a unique one of the plurality of chlorinators.

17. The water sanitization system of claim 16, wherein the power supply includes a timing device electrically connected to the chlorine generation cell of each of the one or more chlorine generators and to each copper/silver ionization cell of the plurality of copper/silver ionization cells, the timing device configured to control the ratio of copper and silver ions to chlorine by independently controlling a supply of electrical power, from the power supply, to each of the chlorine generation cells of the one or more chlorine generators, and to each copper/silver ionization cell of the plurality of copper/silver ionization cells.

* * * * *